(12) United States Patent
Hatch

(10) Patent No.: US 7,663,603 B2
(45) Date of Patent: Feb. 16, 2010

(54) COMMUNICATIONS DEVICE WITH A DICTIONARY WHICH CAN BE UPDATED WITH WORDS CONTAINED IN THE TEXT MESSAGES

(75) Inventor: Richard Hatch, Malvern (GB)

(73) Assignee: Nokia Corporation, Espoo (FI)

( * ) Notice: Subject to any disclaimer, the term of this patent is extended or adjusted under 35 U.S.C. 154(b) by 561 days.

(21) Appl. No.: 10/540,301

(22) PCT Filed: Dec. 18, 2003

(86) PCT No.: PCT/EP03/51072

§ 371 (c)(1),
(2), (4) Date: May 5, 2006

(87) PCT Pub. No.: WO2004/059958

PCT Pub. Date: Jul. 15, 2004

(65) Prior Publication Data

US 2006/0197748 A1    Sep. 7, 2006

(30) Foreign Application Priority Data

Dec. 31, 2002 (GB) ................................. 0230357.6

(51) Int. Cl.
*G09G 5/00* (2006.01)
(52) U.S. Cl. ..................... 345/169; 455/566; 715/811
(58) Field of Classification Search ................. 345/168, 345/169; 705/811, 816; 455/466, 566
See application file for complete search history.

(56) References Cited

U.S. PATENT DOCUMENTS

| 5,818,437 A | 10/1998 | Grover et al. ............... 345/326 |
| 5,953,541 A | 9/1999 | King et al. ................. 395/887 |

FOREIGN PATENT DOCUMENTS

| EP | 0 966 136 A1 | 12/1999 |
| EP | 1 031 914 A2 | 8/2000 |
| EP | 1 179 948 A2 | 2/2002 |
| GB | 2 369 750 A | 6/2002 |
| GB | 2 396 940 A | 7/2004 |

*Primary Examiner*—Regina Liang
(74) *Attorney, Agent, or Firm*—Perman & Green, LLP

(57) ABSTRACT

A mobile telephone handset (MS1) capable of sending and receiving text message. The handset contains disambiguation software (20) operable to disambiguate inputted text with reference to a dictionary (19) stored in memory (10). When receiving new text messages, the dictionary is updated with words contained in the message.

14 Claims, 5 Drawing Sheets

COMMUNICATIONS DEVICE WITH A DICTIONARY WHICH CAN BE UPDATED WITH WORDS CONTAINED IN THE TEXT MESSAGES

This application is the National Stage of International Application No. PCT/EP2003/051072, International Filing Date, Dec. 18, 2003, which designated the United States of America, and which international application was published under PCT Article 21(2) as WO Publication No. WO 2004/059958 A1 and which claims priority from British Application No. 0230357.6, filed Dec. 31, 2002.

This invention relates to a communications device and has particular application to mobile communications devices such as a mobile telephone handset or personal digital assistant (PDA).

It is well known that conventional mobile telephone networks provide text messaging services, in addition to voice telephony. For example, in the global system for mobile communication (GSM), a short message service (SMS) is provided by which users of mobile telephone handsets or other communications devices can type a text message and send it to a recipient at another mobile station coupled to the network.

Also, mobile communications devices may be configured for use with Wireless Application Protocol (WAP), which permits the sending and receiving of e-mail through the Internet.

Conventionally, mobile telephone handsets have a keypad with a limited number of keys, primarily designed for entering numerical information corresponding to a telephone number. When composing a text message, such as a SMS message or a WAP email, the keys of the keypad can also be used to enter individual letters of the alphabet by means of a text editing program. The program operates such that each key, in addition to being associated with a number, is also associated with a group of letters of the alphabet and other text characters. When composing a message in the text editor, the key associated with a particular letter or character is repeatedly pressed so as to cycle through the individual letters or other characters associated with the key until the desired character is displayed. Although this procedure works satisfactorily, it is time consuming and not particularly user friendly.

More recently, predictive text editing programs have been developed which make use of a dictionary of complete words stored in the mobile telephone. The dictionary provides the editing program with additional information to complement the key presses entered on the keypad. By using this information intelligently, the editing program can help the user input their desired word with less keystrokes than non-predictive text editing programs thus making the text entry less time consuming and more user friendly.

An example of a predictive editing program is the T9™ disambiguation software found in many mobile telephone handsets e.g. the Nokia model 3210. This software is described in detail in U.S. Pat. Nos. 5,818,437 and 5,953,541, assigned to Tegic Communications Inc of Seattle, Wash., USA. When entering a word using the software, the user operates each key only once rather than scrolling through the individual characters associated with the key. Thus, each key operation has an associated ambiguity due to the fact that a number of characters are associated with the key. Accordingly, the key sequence produced by actuating keys corresponding to a word only once has an associated ambiguity because the sequence could represent more than one word. In order to resolve the ambiguity of this inherently ambiguous key sequence, a word or words corresponding to the ambiguous key sequence are stored in the memory and displayed to the user so that a selection can be made. This procedure greatly reduces a number of key strokes required to enter text.

Disambiguation is carried out by reference to pre-programmed dictionary of words associated with the individual ambiguous key sequences. Of course, the dictionary cannot contain every possible word that may want to be entered by the user. For example, made-up words, slang words, names of people and places will often be absent from the pre-programmed dictionary. Therefore, when no match exists between the users desired word and the words in the dictionary, a non-predictive text editor is made available to enable the user to unambiguously enter the desired word. The pre-programmed dictionary is then updated to include the newly-entered word and its associated ambiguous key sequence. The new word will then be available for future matching by the disambiguation software.

According to a first aspect of the present invention there is provided a data communications device, comprising: a receiver for receiving items of textual information, a plurality of keys each associated with a respective plurality of different text characters, the keys being operable by the user to produce an ambiguous key sequence corresponding to an item of textual information, a memory configuration to store different ones of said ambiguous key sequences and to associate with each thereof at least one item of textual information corresponding to the ambiguous key sequence, a data processor operable in response to the user actuating the keys to produce one of the ambiguous key sequences, to retrieve the textual information associated therewith from the memory configuration to permit the user to disambiguate the key sequence, wherein the receiver is coupled to the memory configuration, and is operable to identify, based on knowledge of the association of text characters to the plurality of keys, an ambiguous key sequence corresponding to an item of received textual information, and to store the item of received textual information in the memory configuration such that it is associated with the identified ambiguous key sequence.

A communication device in accordance with the invention has the advantage that the items of textual information received by the device are made available for association and disambiguation when entering ambiguous key sequences.

The user no longer has to unambiguously input unusual words from text messages already received by the device since these words can automatically be made available to the disambiguation software. Such unusual words might be place names, street names, people's names etc. The unusual words may also be SMS slang or abbreviation words such as 'thnx' for 'thanks' or btw for 'by the way'. These words are generally not found in the standard T9™ English dictionary.

A communication device in accordance with the invention is especially useful in real-time communication applications such as instant messaging or chat features that are becoming popular in mobile devices. The originator of a message may make the effort of entering the new word using an unambiguous method. Thereafter, the other users who have devices in accordance with the invention would be able to use the new word using their disambiguation software.

With location services becoming popular in mobile communication devices, new town names, street names, building names etc. may well be sent to the devices. A communication device in accordance with the invention would have the advantage of being able to use these new location dependent words in future communications. For example, a location based service might provide a user of a portable cellular telephone with the name of a local public house showing a particular sporting event e.g. 'Liverpool versus Newcastle showing at the Hobgoblin'. The user may then send an SMS message to his friends to meet at the public house. In accordance with the invention, the words Liverpool, Newcastle and Hobgoblin would all now be available to the disambiguation software of the telephone.

Preferable the device includes a display device to display the text items retrieved by the processor so as to enable the key sequence to be disambiguated.

The communications device may be a mobile telephone handset and/or a PDA.

The received items of textual information are preferably contained in a text message such as an email, and SMS message or an MMS message.

However, the items could also be received during a WAP on-line browsing session for example.

According to a second aspect of the present invention there is provided a mobile communications device comprising: a memory containing a dictionary of stored words, a predictive text editor coupled to the memory to enable prediction of words input by a user, and a receiver for receiving text messages, characterised in that the receiver selectively stores words contained in the text messages in the memory for use by the predictive text editor.

Preferably, the predictive text editor is a disambiguation text editor such as the T9™ editor.

According to a third aspect of the present invention there is provided a method of programming a communications device according to the first or second aspect of the invention, comprising identifying an ambiguous key sequence corresponding to an item of received textual information, and storing an association between the identified ambiguous key sequence and the item of received textual information.

Preferably, the method includes determining if the identified ambiguous key sequence is already stored, and if not, storing the identified ambiguous key sequence together with the association between the identified ambiguous key sequence and the item of received textual information.

Aspects of the invention that have been described in relation to disambiguation software may apply more generally to predictive editor software which use dictionaries stored locally or even remotely.

In order that the invention may be more fully understood an embodiment thereof will now be described by way of example with reference to the accompanying drawings in which.

Figure 1:
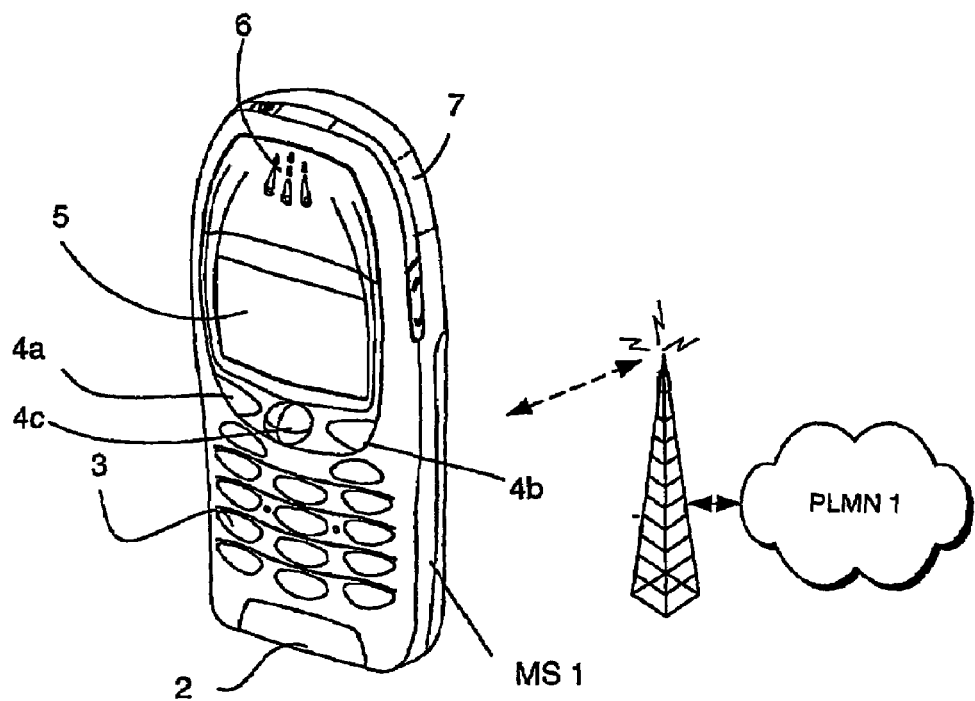
FIG. 1 is a schematic block diagram illustrating a mobile telephone handset which can communicate through a public land mobile network (PLMN)

In FIG. 1, a mobile station in the form of a battery driven telephone cellular handset MS 1, is shown schematically in radio communication with PLMN 1. The mobile handset MS1, includes a microphone 2, keypad 3, soft keys 4, a liquid crystal display device 5, ear-piece 6 and internal antenna 7.

Figure 2:
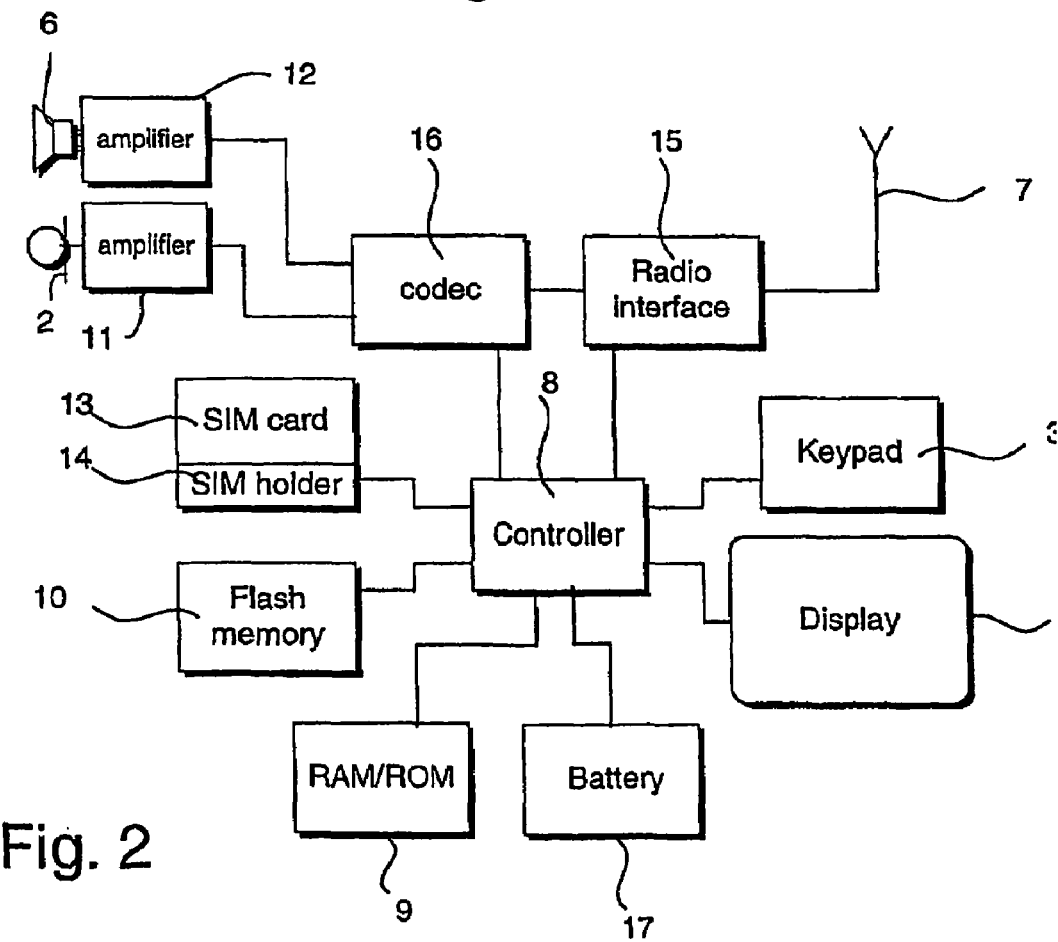
FIG. 2 is a schematic block diagram of the circuitry of the mobile handset shown in FIG. 1.

The circuitry of the handset MS 1 is shown in more detail in FIG. 2. Signal processing is carried out under the control of a digital micro-controller 8 which has an associated RAM/ROM 9 and flash memory 10. Electrical analogue audio signals are produced by microphone 2 and amplified by preamplifier 11. Similarly, analogue audio signals are fed to the ear-piece 6 through an amplifier 12. The micro-controller receives instruction signals from the keypad and so-called soft keys 4a,b,c, and controls operation of the LCD display 5.

Information concerning the identity of the user is held on a smart card 13 in the form of a GSM SIM card which contains the usual GSM international mobile subscriber identity and encryption $K_1$ that is used for encoding the radio transmission in a manner well known per se. The SIM card 13 is removably received in a SIM card holder 14. Radio signals are transmitted and received by means of the antenna 7 connected through a r.f. stage 15 to a codec 16 configured to process signals under the control of a micro-controller 8. Thus, in use, for speech, the codec 16 receives analogue signals from the microphone amplifier 11, digitises them into a form suitable for transmission and feeds them to the rf stage 15 for transmission through antenna element 7 to PLMN 1 shown in FIG. 1. Similarly, signals received from PLMN 1 are fed through the antenna element to be demodulated by the rf stage 15 and fed to codes 16 so as to produce analogue signals fed to amplifier 12 and ear-piece 6.

As known in the art, GSM provides a short message service (SMS) which allows users to type a text message, which is transmitted through the PLMN to another mobile handset and displayed on its display 5. The text message is composed using the keypad 3 of the handset MS1. The text is inputted into a focus region 18 of the display 5 shown in FIG. 3. The focus region can be scrolled up and down the display by means of a scrolling key 4c for text selection as will be described later.

Figure 3:
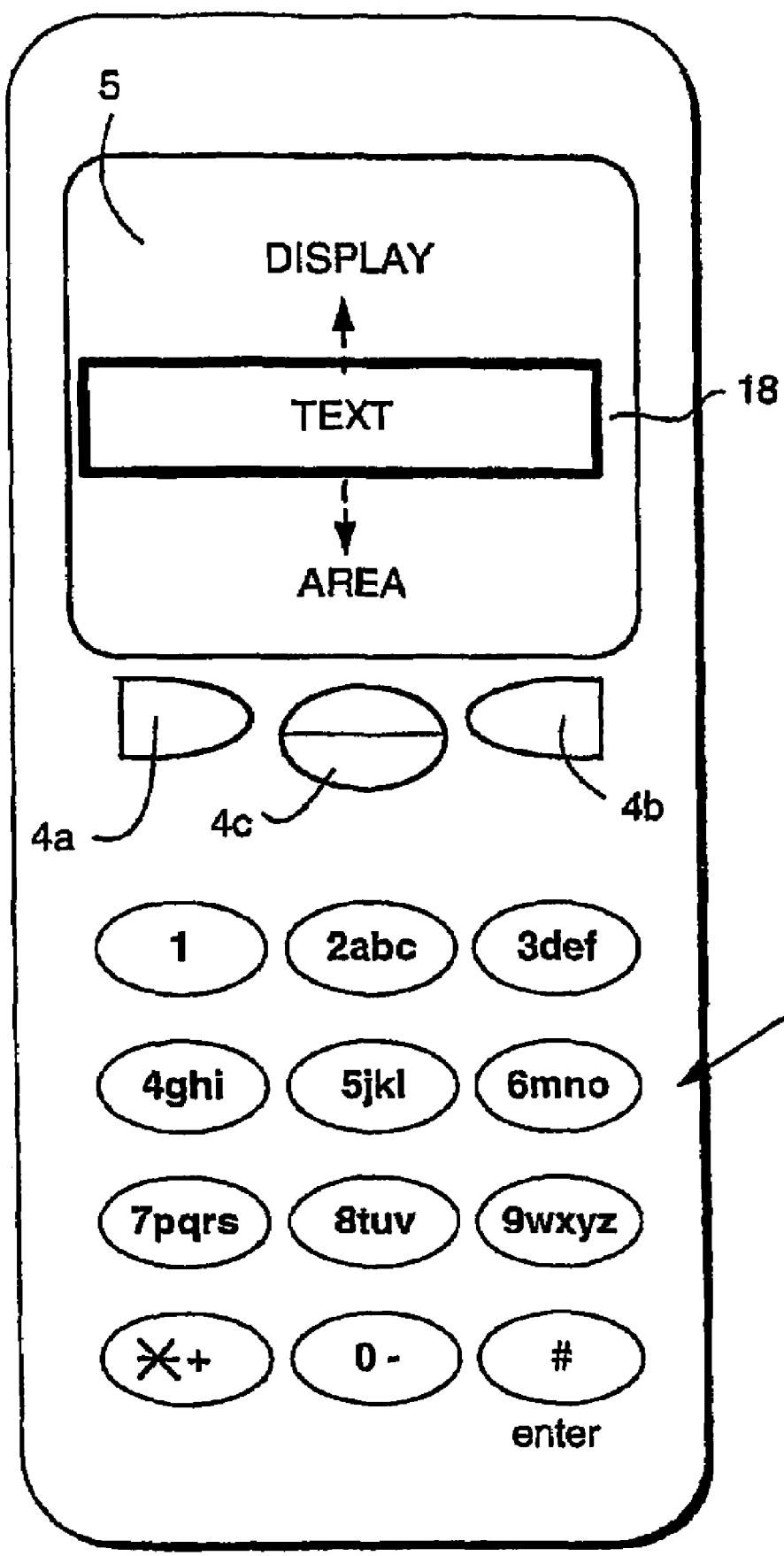
FIG. 3 illustrates schematically the display of the handset and the associated keys 4.

As shown in FIG. 3, some of the keys for keypad 3 are associated both with numbers and alphanumeric characters. For convenient reference, the individual keys will be identified by their number e.g. the key marked with the number 3 will be referred to as the "3-key". Thus, the 4-key is associated not only with the number "4" but also the letters "ghi". Conventionally, an individual one of the associated letters is selected by successive operations of the 4-key. For example, if the letter "i" is to be inserted into the text message, on the first operation of the 4-key, the letter "g" is displayed, the second operation displays "h" and the third operation displays "i". A further operation displays "4" when entering text for an SMS. It will be understood that by this approach, the limited number of keys of the keypad can be used to enter all the letters of the alphabet and other characters for conventional punctuation.

However, a problem with this conventional text entry technique is the multiple use of keys is laborious, time consuming and not particularly user friendly.

More recently, mobile stations have been provided with disambiguation software which simplifies the entry of text. The disambiguation software allows individual key entries to be used instead of multiple entries as in the past. The user enters an ambiguous key sequence, comprising a sequence of individual key operations. For each key operation in the ambiguous sequence, the key marked with the group of letters containing the desired letter is operated once. Individual ambiguous key sequences are stored in the memory, each associated with words or like text items corresponding to the sequence. Since the key sequence is inherently ambiguous, more than one word corresponding to the sequence may be stored and the user is given an option to select one of them. For example, successive operation of the keys, 4, 6, 6, 3 shown in FIG. 3 could correspond to the entry of the word "home" or "good". The ambiguous key sequence "4663" is however associated in the memory with text items "home" and "good" so that when the ambiguous key sequence is entered by the user, both the words "home" and "good" are displayed on the display 5 and the user can then make a selection. For some key sequences, there will be only one item of text associated with it, in which case the user does not need to make a selection. It would be understood that this text entry method is much simpler for the user because individual keys do not need to be operated repetitively to select individual characters.

Disambiguating software is marketed by Tegic Communications Inc of Seattle, Wash., USA and is described in more detail in U.S. Pat. Nos. 6,818,437 and 5,953,541.

Figure 4:
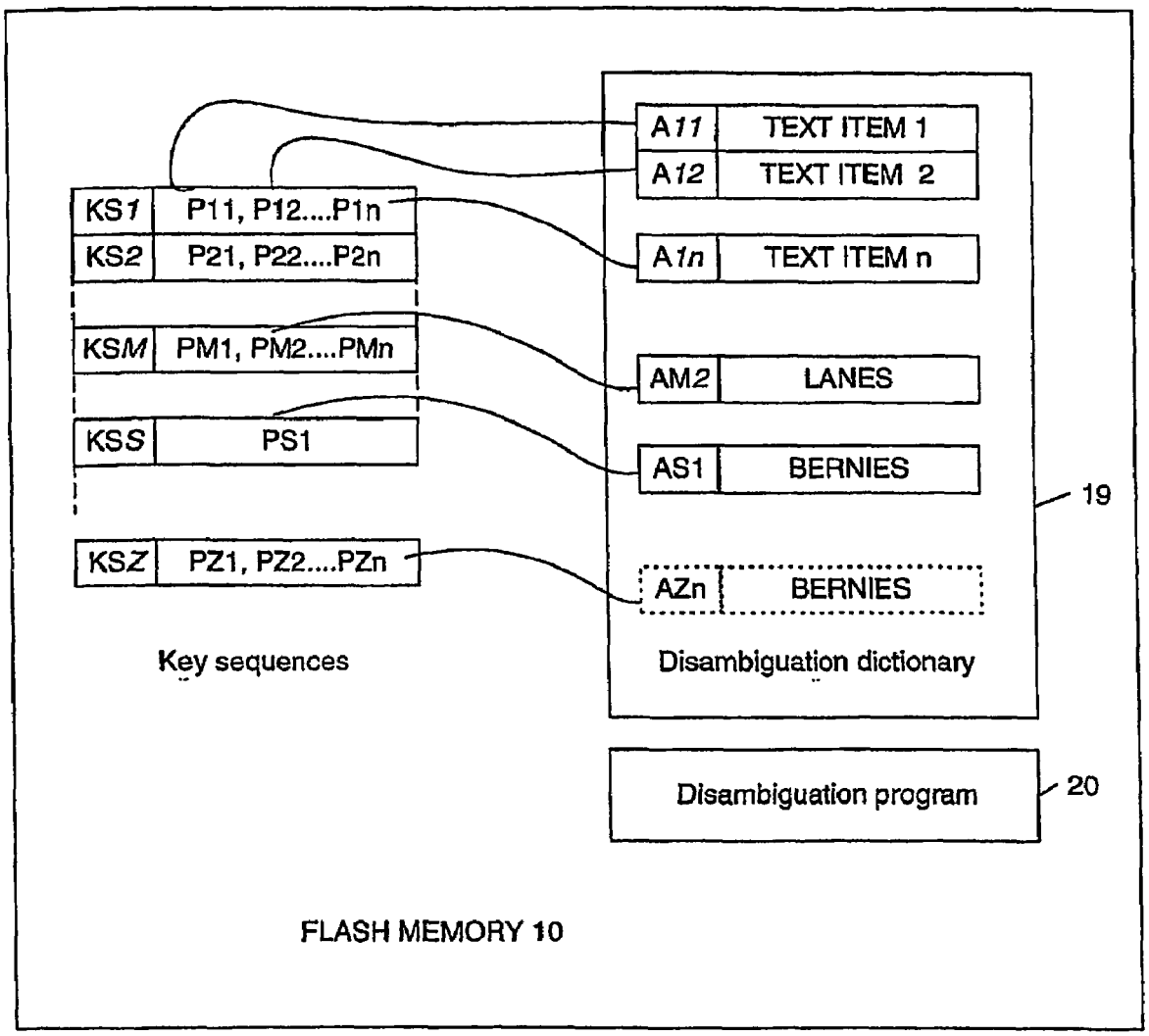
FIG. 4 is a schematic illustration of the memory organisation for the flash memory.

In accordance with the invention, the disambiguation software is used in relation to received textual information, for example alphabetic, alphanumeric or symbolic characters, within a messaging service, for example SMS, MMS or e-mail. FIG. 4 illustrates the memory organisation for flash memory 10. The flash memory 10 amongst other things includes stored ambiguous key sequences KS1-KSM-KSS-KSZ. Each ambiguous key sequence corresponds to sequence of individual actuation of the keys of keypad 3.

As previously explained, each individual ambiguous key sequence KS may correspond to more than one text item such a word or phrase and the corresponding words or phrases are stored in a disambiguation dictionary 19 within the flash memory 10. In more detail, each key sequence KS is stored with a set of associated pointers P which point to memory address locations corresponding to the text items which are associated with the key sequence in order to enable the user to resolve an ambiguity associated with the key sequence.

Considering for example key sequence KS1, pointers P11, P12 . . . P1$n$ Indicate the address locations of text items 1-$n$ which correspond to the ambiguous key sequence KS1. In this example, the pointer P11 points to address A11 at which text item 1 is stored. Similarly, pointer P12 points to the address of text item 2 stored at address location A12. Each ambiguous key sequence KS includes a sufficient number of pointers P corresponding to all of the stored text items appropriate to resolve the ambiguity of the key sequence. Thus generally, key sequence KS1 includes up to n pointers, which points to the addresses for corresponding n text items. In FIG. 4, this is illustrated schematically by pointer P1$n$ which points to address A1$n$ corresponding to text item n.

For example, the ambiguous key sequence may comprise a sequential operation of the keys 4, 6, 6, 3 of the keypad 3. As previously explained, this sequence of key operations is ambiguous because it could represent either the word "home" or "good". Thus, in this example, the pointer P11 points to address A11 which corresponds to the location of text item 1—"good", whereas pointer P12 points to address A12 corresponding to text item 2—"home".

In operation, the controller 8 shown in FIG. 2 runs a disambiguation program 20 shown in FIG. 4 so that when the user operates the keypad and produces the key sequence KS1, the key sequence is detected by the controller 8 and then, using the pointers P11, P12, text item 1 and text item 2 are retrieved from the memory addresses A11 and A12. The text items are then displayed on the display 5 shown in FIG. 3. The user then operates scrolling key 4$c$ to move the focus window 18 so as to select either "home" or "good" in order to resolve the ambiguity.

Figure 5:
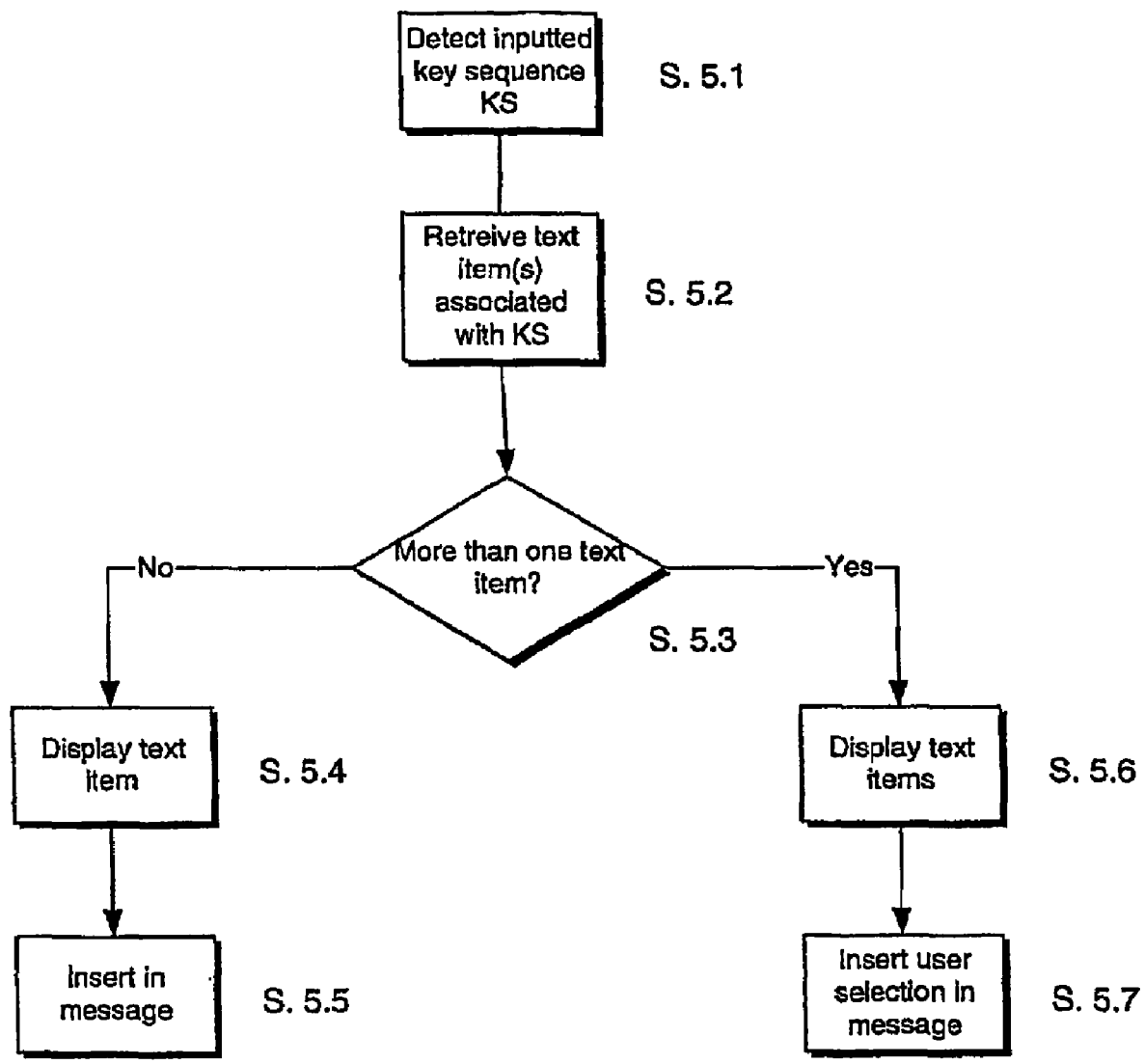
FIG. 5 is a schematic flowchart of the process for retrieving text items from the disambiguation dictionary.

This process is shown in more detail in FIG. 5. At step s5.1, the controller 8 detects an individual ambiguous key sequence KS and at step s5.2 retrieves the or each text item associated with the identified key sequence.

At step s5.3, a test is made to see whether more than one text item is retrieved. If only one is retrieved, it is displayed on the display 5 of the mobile handset at step s5.4 and also inserted into the text message at step s5.5.

Alternatively, if more than one text item is retrieved, the retrieved items are displayed at step s5.6 and the display 5 of the handset at step s5.6. The display may be configured so as to present the most probable text item first or preferentially. For example, the text items may be configured in the column ranked according to the probability, based on previous usage. The user then selects one of the displayed items and inserts it in a message at step s5.7.

Figure 6:
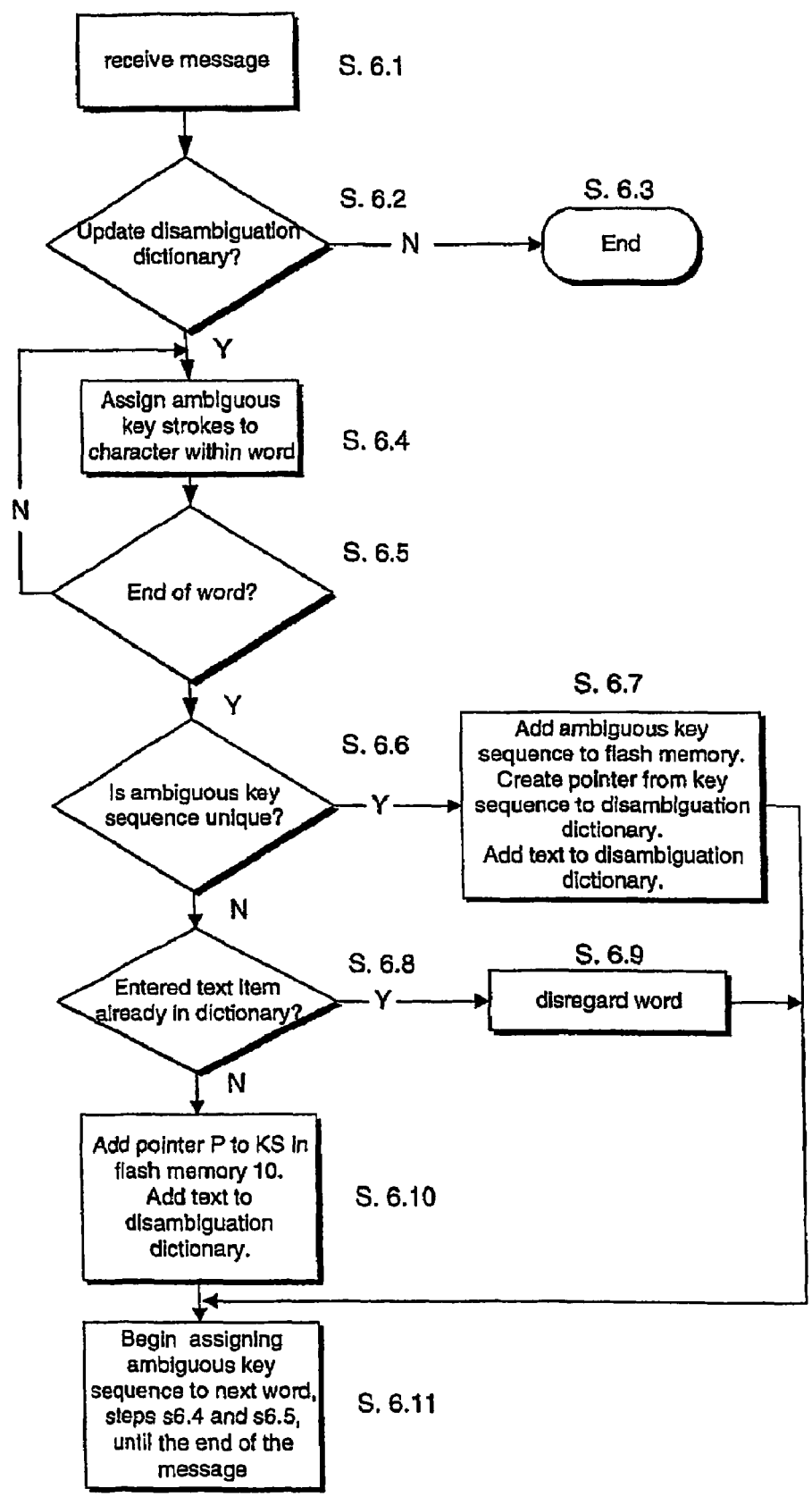
FIG. 6 is a schematic flowchart of process for determining the ambiguous key sequence for a word which is not already present within the pre-programmed dictionary.

FIG. 6 outlines a flowchart process for how the disambiguation program 20 is able to generate its own ambiguous key sequence when a received communication contains textual information which does not already exist within the disambiguation dictionary 19.

Step s6.1 indicates that a message has been received. Upon reading the message the disambiguation program 20 prompts the user if they would like any words which may not be present in the disambiguation dictionary 19 to be added, as shown by step s6.2. The user then has a choice to decline the request in which case the disambiguation program is brought to an end, step s6.3. The user may wish to reply to the message and seeing that the message contains place names or nicknames which may not be present in the disambiguation dictionary 19 the user responds positively to the prompt as the user may wish to re-use some of the text within the received message.

Disambiguation program 20 will then take one piece of textual information at a time, for example in the message, "meeting at Bernies or Marthas". The disambiguation program will begin by assigning a ambiguous key sequence to the word 'meeting'. It will perform this on a character by character basis assigning a ambiguous key stroke to each letter step s6.4, for example 'meeting' would be assigned the ambiguous key strokes '6 3 3 8 4 6 4'. This assigning of ambiguous key strokes is outlined in step s6.4 and step s6.5 until the end of the phrase which is recognised by the disambiguation software by a character space.

Having assigned a ambiguous key sequence to the word 'meeting' the disambiguation program 20 would then determine if the ambiguous key sequence of '6 3 3 8 4 6 4' was unique, step s6.6. It would do this by comparing the ambiguous key sequence for 'meeting' with other key sequences held in the flash memory 10. It is likely that 'meeting' would be present in a disambiguation dictionary 19 and a ambiguous key sequence would therefore also exist. The disambiguation program 20 would then determine if a text item already existed within the disambiguation dictionary 19, the disambiguation program would then disregard the word 'meeting' as it is already present within the disambiguation dictionary 19.

The process outlined above would be repeated for all phrases or words within the received communication. In our example the message 'meeting at Bernies or Marthas', it is unlikely that 'Bernies' or 'Marthas' would exist in the pre-programmed dictionary. Having determined the ambiguous key sequence for 'Bernies' of '2 3 7 6 4 3 7' as outlined in steps s6.4 and s6.5, step s6.6 determines H the ambiguous key sequence is unique. For our example if we assume that the key sequence does not exist then this unique ambiguous key sequence, step s6.7, KSS in FIG. 4, would be added to the flash memory 10 and a pointer PSI would be added. The pointer PSI would then create a link to the disambiguation dictionary 19 with an associated text item, AS1 of 'Bernies'.

If we assume for the given example that the ambiguous key sequence corresponding to 'Bernies' did exist, the disambiguation program would then determine if the text item already existed, step s6.8. As earlier outlined, a new text item which already exists within the disambiguation dictionary 19 would be disregarded. In our example the text item 'Bernies' does not already exist within the disambiguation dictionary 19, the disambiguation program then adds a pointer PZn in FIG. 4 to the key sequence KSZ in FIG. 4 which points to the text item 'Bernies' which has been added to the disambiguation dictionary, step s6.10.

The applying of key sequences to each word within the received message would be carried out until the end of the message, step s6.11, at which point the disambiguation program would end and inform the user by means of an audio prompt in the form of a beep or a visual prompt that the new words had been added to the disambiguation dictionary. The user would then be able to reply to the message in the knowledge that any words contained within the message may be re-used without the need for multiple presses of a key for each character within the word.

The methods outlined above need not be done immediately after a message is received but retrospectively, the methods outlined above may also be applied to the user memory where received or transmitted messages or data are stored.

Furthermore, the memory organisation may be configured differently from the described example. The disambiguation dictionary 19 and/or software 20 need not necessarily be held in the flash memory 10 but could instead be held in ROM 9.

The invention is not restricted to mobile telephone handsets but can also be applied to personal digital assistants and other communications devices, which may or may not be mobile.

The present invention includes any novel feature or combination of features disclosed herein either explicitly or any generalisation thereof irrespective of whether or not it relates to the claimed invention or mitigates any or all of the problems addressed.

The invention claimed is:

1. A data communications device, comprising:
    a receiver for receiving items of textual information contained in an incoming text message,
    a data processor operable in response to the received items of textual information to automatically extract textual information directly from said incoming text message,
    a plurality of keys each associated with a respective plurality of different text characters, the keys being operable by the user to produce an ambiguous key sequence corresponding to an item of textual information,
    a memory configuration to store different ones of said ambiguous key sequences and to associate with each thereof at least one item of said extracted textual information corresponding to the ambiguous key sequence,
    wherein the data processor is operable in response to the user actuating the keys to produce one of the ambiguous key sequences, to retrieve the extracted textual information associated therewith from the memory configuration to permit the user to disambiguate the produced key sequence,
    wherein the receiver is coupled to the memory configuration, and is operable to identify, based on knowledge of the association of text characters to the plurality of keys, an ambiguous key sequence corresponding to an item of the received textual information in said incoming text message, and to store the item of received textual information in the memory configuration such that it is associated with the identified ambiguous key sequence.

2. A device according to claim 1, including a display device to display the text items retrieved by the data processor so as to enable the key sequence to be disambiguated.

3. A device according to claim 1, comprising a mobile telephone handset.

4. A device according to claim 1, comprising a PDA.

5. A device according to claim 1, wherein the text message is an SMS message or an MMS message.

6. A device according to claim 1, wherein the text message is an email message.

7. A device according to claim 1 configured for composing and sending text messages.

8. A device according to claim 7 configured for composing and sending an SMS message or an MMS message.

9. A device according to claim 7 configured for composing and sending an e-mail.

10. A device according to claim 1 wherein the items of textual information are individual words.

11. A mobile communications device comprising:
    a receiver for receiving text messages,
    a data processor operable in response to the received text messages to automatically extract textual information directly from said received text messages,
    a memory containing a dictionary of stored words, and
    a predictive text editor coupled to the memory to enable prediction of words input by a user,
    wherein the receiver is configured to selectively store words contained in the extracted textual information in the memory for use by the predictive text editor.

12. A communications device according to claim 11, wherein the predictive text editor is a disambiguation text editor.

13. A method of programming a communications device according to claim 1, comprising identifying an ambiguous key sequence corresponding to an item of received textual information, and storing an association between the identified ambiguous key sequence and the item of received textual information.

14. A method according to claim 13, including determining if the identified ambiguous key sequence is already stored, and if not, storing the identified ambiguous key sequence together with the association between the identified ambiguous key sequence and the item of received textual information.

* * * * *